(12) United States Patent
Oh

(10) Patent No.: US 10,882,552 B2
(45) Date of Patent: Jan. 5, 2021

(54) CONTROL METHOD OF A REAR WHEEL STEERING SYSTEM

(71) Applicants: HYUNDAI MOTOR COMPANY, Seoul (KR); KIA MOTORS CORPORATION, Seoul (KR)

(72) Inventor: Jun Wook Oh, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 176 days.

(21) Appl. No.: 16/190,895

(22) Filed: Nov. 14, 2018

(65) Prior Publication Data

US 2020/0086914 A1 Mar. 19, 2020

(30) Foreign Application Priority Data

Sep. 19, 2018 (KR) .................. 10-2018-0111869

(51) Int. Cl.
*B60T 8/88* (2006.01)
*B62D 6/00* (2006.01)
*B62D 6/02* (2006.01)
*B62D 7/14* (2006.01)
*B62D 7/15* (2006.01)

(52) U.S. Cl.
CPC ..................................... *B62D 6/02* (2013.01)

(58) Field of Classification Search
CPC .......... B62D 7/148; B62D 7/159; B62D 6/02; B60T 8/885; B60T 2260/022; B60T 2270/416; B60T 8/17; B60T 8/00; B60T 30/14

USPC .......................................... 701/43
See application file for complete search history.

(56) References Cited

U.S. PATENT DOCUMENTS

| 2003/0226702 A1* | 12/2003 | Imai ................... | B60K 23/0808 180/247 |
| 2009/0143942 A1* | 6/2009 | Matsushita .......... | B62D 5/0481 701/43 |
| 2010/0300794 A1* | 12/2010 | Stabrey ................ | B60T 8/1755 180/275 |

FOREIGN PATENT DOCUMENTS

| JP | 2001260859 A | * | 9/2001 | ............. B60T 8/885 |
| JP | 2004330956 A | * | 11/2004 | |
| JP | 3684757 | | 8/2005 | |
| JP | 2008207678 A | * | 9/2008 | |
| JP | 2011037338 A | * | 2/2011 | |
| JP | 2015148495 | | 8/2015 | |
| KR | 101681417 | | 11/2016 | |

* cited by examiner

*Primary Examiner* — Behrang Badii
*Assistant Examiner* — Hossam M Abd El Latif
(74) *Attorney, Agent, or Firm* — Lempia Summerfield Katz LLC

(57) ABSTRACT

A control method of a rear wheel steering system prevents a sudden change in a rear wheel steering control amount when an error occurs in a wheel speed sensor. The control method detects an error in wheel speed sensors based on output values of the wheel speed sensors. A vehicle speed is estimated by using output values of remaining normal wheel speed sensors except for an output value of an abnormal wheel speed sensor where an error is detected, when an error in the wheel speed sensor is detected. Rear wheels are steered and controlled based on the estimated vehicle speed.

9 Claims, 4 Drawing Sheets

CONTROL METHOD OF A REAR WHEEL STEERING SYSTEM

CROSS REFERENCE TO RELATED APPLICATION

The present application claims priority to Korean Patent Application No. 10-2018-0111869, filed Sep. 19, 2018, the entire contents of which are incorporated herein for all purposes by this reference.

BACKGROUND

Field of the Disclosure

The present disclosure relates to a control method of a rear wheel steering system, in which a sudden change in a rear wheel steering control amount is prevented when an error occurs in a wheel speed sensor.

Description of the Related Art

In a four-wheel steering system, at a low speed the rear wheel steering angle is controlled to a phase opposite to the front wheel steering angle so as to reduce the turning radius, and at high speed the rear wheel steering angle is controlled to the same phase as the front wheel steering angle, thereby improving steering stability.

That is, by mounting an actuator such as a hydraulic device, a motor, and a speed reducer for rear wheel steering angle control, the rear wheels of a vehicle are appropriately steered depending on the running condition of the vehicle, thereby improving the running performance of the vehicle.

Meanwhile, in the conventional rear wheel steering system, the vehicle speed is estimated based on the average value of the wheel speeds measured by the four wheel speed sensors. The rear wheels are steered and controlled according to the estimated vehicle speed.

However, when there is an error in the signal output from the wheel speed sensor, or in the case of rapid braking/rapid acceleration, the estimated vehicle speed may be changed rapidly due to a certain wheel being locked or spinning. When the vehicle speed is suddenly changed, the rear wheel steering control amount also changes rapidly, whereby a sense of difference may occur for the rear wheel control and stable rear wheel control may not be performed.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure is made keeping in mind the above problems occurring in the related art. The present disclosure is intended to propose a control method of a rear wheel steering system, in which a sudden change in a rear wheel steering control amount is prevented when an error occurs in a wheel speed sensor.

In order to achieve the above object, according to an aspect of the present disclosure, a control method of a rear wheel steering system is provided. The control method includes detection of an error in four wheel speed sensors by a controller based on output values of the wheel speed sensors. The method includes estimation of a vehicle speed using output values of remaining normal wheel speed sensors except for an output value of an abnormal wheel speed sensor where an error is detected, when the controller detects an error in the wheel speed sensor. The method includes controlling steering of rear wheels by the controller based on the estimated vehicle speed. In the estimation of a vehicle speed, when one abnormal wheel speed sensor of the four wheel speed sensors is detected, an output value of the abnormal wheel speed sensor is replaced with an average value of output values of two normal wheel speed sensors except for a remaining normal wheel speed sensor disposed at a position diagonal to the abnormal wheel speed sensor.

In the detection of an error, when wheel acceleration output from the wheel speed sensors is equal to or greater than a set value, it may be determined that an error has occurred.

In the estimation of a vehicle speed, when two abnormal wheel speed sensors of the four wheel speed sensors are detected, an output value of the abnormal wheel speed sensor may be replaced with an average value of output values of remaining two normal wheel speed sensors.

In the estimation of a vehicle speed, when three abnormal wheel speed sensors of the four wheel speed sensors are detected, an output value of the abnormal wheel speed sensor may be replaced with an output value of remaining one normal wheel speed sensor.

After the estimation of a vehicle speed, the abnormal wheel speed sensor may be diagnosed as normal when a state where an absolute value of a difference between the output value of the abnormal wheel speed sensor and the output value of the normal wheel speed sensor is equal to or less than a set value is maintained for a predetermined time.

In the estimation of a vehicle speed, when the vehicle is accelerated by accelerator pedal operation, the vehicle speed may be estimated based on a minimum value among all the output values of the wheel speed sensors.

In the estimation of a vehicle speed, when the vehicle is decelerated by brake pedal operation, the vehicle speed may be estimated based on a maximum value among all the output values of the wheel speed sensors.

In the estimation of a vehicle speed, when a vehicle dynamic control system is operated, the vehicle speed may be estimated based on an average value of two output values except for a minimum value and a maximum value among all the output values of the wheel speed sensors.

According to the present disclosure, the above described control method is advantageous in that, when an error is detected in the wheel speeds of the wheel speed sensors, based on the wheel speed of the normal wheel speed sensor, the abnormal wheel speed is replaced to estimate the vehicle speed. Thus, it is possible to estimate vehicle speed more accurately than the conventional vehicle speed estimation result. As a result, a sudden change in a rear wheel steering control amount is prevented, thereby preventing occurrence of a sense of difference due to rear wheel steering control.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, an embodiment of the present disclosure is described in detail with reference to the accompanying drawings.

A control method of a rear wheel steering system of the present disclosure, in which when an error occurs in the signal output from four wheel speed sensors S1, S2, S3, and S4, estimates the vehicle speed using a normal wheel speed sensor excluding an abnormal wheel speed sensor. A sudden change in a rear wheel steering control amount is thus prevented. The control method includes detection of an error, estimation of a vehicle speed, and control of steering.

Figure 1:
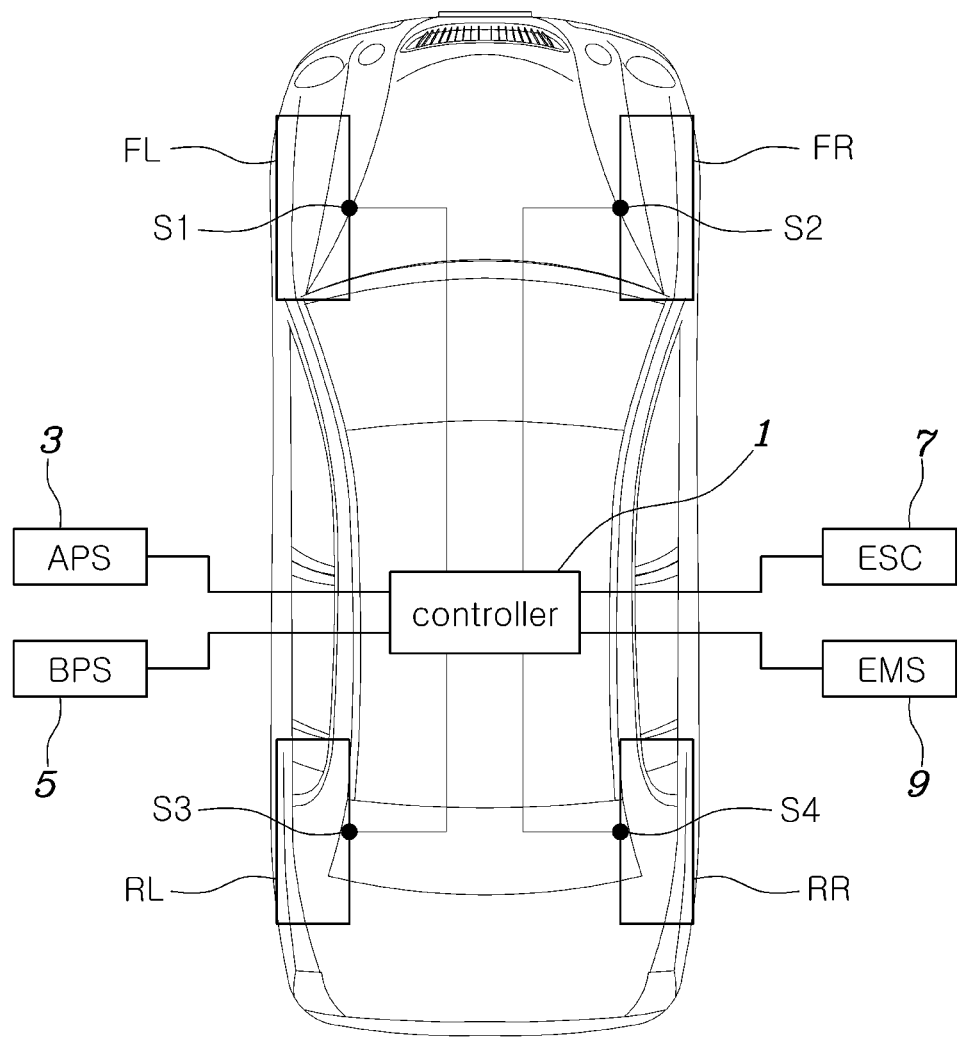
FIG. 1 is a schematic view showing a configuration of a rear wheel steering system of a vehicle according to the present disclosure.
Figure 2A:
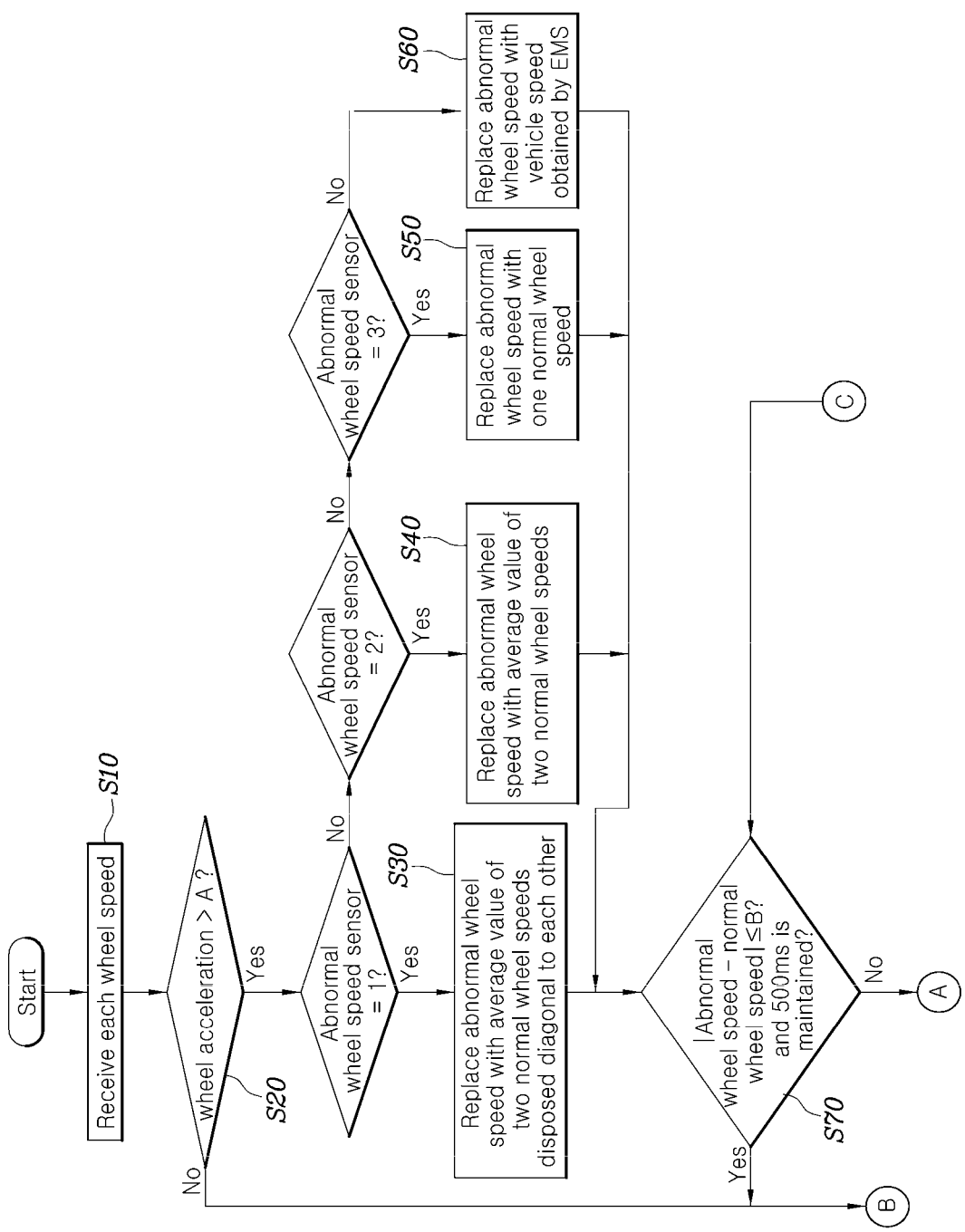
FIGS. 2A and 2B are flow charts sequentially showing a control process for the rear wheel steering system according to the present disclosure.
Figure 2B:
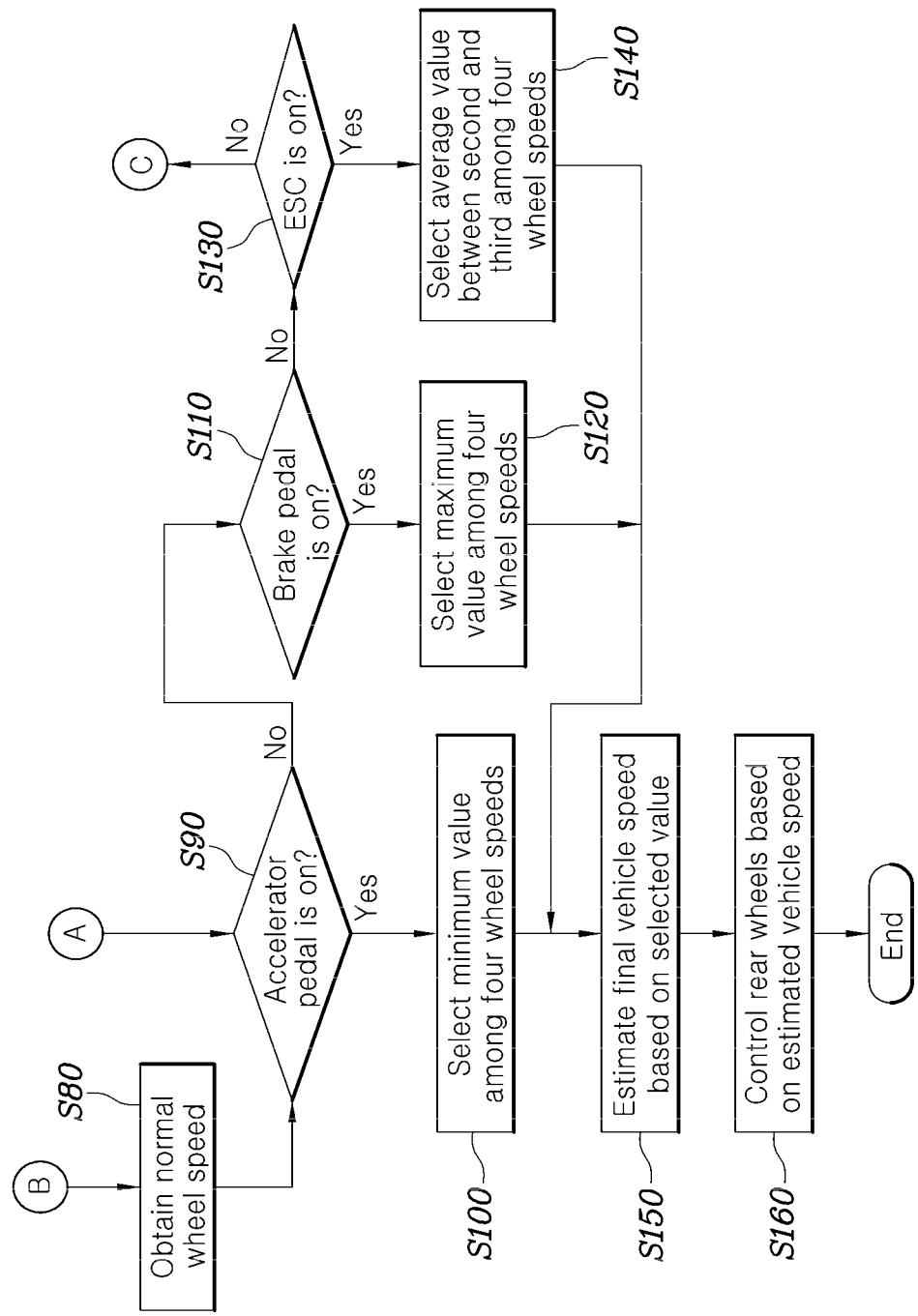

Referring to FIGS. 1, 2A, and 2B, to be more specific to the present disclosure, firstly, in the step of detection of an error, a controller 1 can detect an error in the wheel speed sensors S1, S2, S3, and S4 based on output values of the wheel speed sensors S1, S2, S3, and S4.

For example, when the wheel acceleration output from the wheel speed sensors S1, S2, S3, and S4 is equal to or greater than a set value, it is determined that an error has occurred. As a result, the abnormal wheel speed sensor can be detected.

In the step of estimation of a vehicle speed, when the controller 1 detects an error in the wheel speed sensors S1, S2, S3, and S4, a vehicle speed can be estimated by using output values of remaining normal wheel speed sensors except for an output value of an abnormal wheel speed sensor where an error is detected.

In particular, in the step of estimation of a vehicle speed, when one abnormal wheel speed sensor of the four wheel speed sensors S1, S2, S3, and S4 is detected, an output value of the abnormal wheel speed sensor is replaced with an average value of output values of two normal wheel speed sensors except for a remaining normal wheel speed sensor disposed at a position diagonal to the abnormal wheel speed sensor.

Further, in the step of control of steering, the controller 1 can control rear wheels based on the estimated vehicle speed.

In other words, in the case where an error has occurred in one wheel speed sensor of the four wheel speed sensors S1, S2, S3, and S4, only the output values of two normal wheel speed sensors are used without using the average value of the output values of three normal wheel speed sensors. This is because there is a slight difference in wheel speed between the front and rear wheels, and there is a difference in wheel speed between the left and right wheels when turning.

Accordingly, for example, it may be detected that an error has occurred in the wheel speed, which is the output value, of the wheel speed sensor S1 of the front left wheel FL. When the abnormal wheel speed is replaced with the average value of the wheel speeds measured from the front right wheel FR, the rear left wheel RL, and the rear right wheel RR, which are normal wheel speed sensors S2, S3, and S4, one more rear wheel than the front wheel is included in the calculation, and thus the abnormal wheel speed is replaced with the wheel speed value which is weighted more on the speed of the rear wheel.

Accordingly, for the wheel speed replacing the wheel speed of the abnormal wheel speed sensor S1 to have the same weight as the front, rear, left, and right wheels, the wheel speed of the rear right wheel RR, which is at the normal wheel speed but is disposed at a position diagonal to the abnormal wheel speed sensor, is excluded. The wheel speed of the front left wheel FL, which is the abnormal wheel speed, is also excluded. The average of output values of the remaining two normal front right wheel FR and rear left wheel RL is calculated, which replaces the wheel speed of the abnormal wheel speed sensor, whereby more accurate vehicle speed estimation is possible.

Meanwhile, in the estimation of a vehicle speed, when two abnormal wheel speed sensors of the four wheel speed sensors S1, S2, S3, and S4 are detected, an output value of the abnormal wheel speed sensor is replaced with an average value of output values of the remaining two normal wheel speed sensors.

For example, when the errors are detected in the wheel speed sensors S1 and S2 of the FL and the FR, the wheel speed of the FL and the FR is replaced with the average value of the wheel speed of the wheel speed sensors S3 and S4 of the RL and the RR.

In addition, in the estimation of a vehicle speed, when three abnormal wheel speed sensors of the four wheel speed sensors S1, S2, S3, and S4 are detected, the output value of the abnormal wheel speed sensor can be replaced with the output value of the remaining one normal wheel speed sensor.

For example, when the errors are detected in the wheel speed sensors S1, S2, and S3 of the FL, the FR, and the RL, the wheel speed of the FL, the FR, and the RL where the errors have occurred is replaced with the wheel speed of the wheel speed sensor S4 of the RR.

Further, after the estimation of a vehicle speed, the abnormal wheel speed sensor may be diagnosed as normal when a state where an absolute value of a difference between the output value of the abnormal wheel speed sensor and the output value of the normal wheel speed sensor is equal to or less than a set value is maintained for a predetermined time.

For example, the abnormal wheel speed sensor is diagnosed as normal when the absolute value of the value, obtained by subtracting the wheel speed of the normal wheel speed sensor from the wheel speed of the abnormal wheel speed sensor, is equal to or less than a predetermined value, and this state is maintained for 500 ms or more.

Meanwhile, in the estimation of a vehicle speed, when the vehicle is accelerated by accelerator pedal operation, the vehicle speed may be estimated based on the minimum value among all the output values of the wheel speed sensors S1, S2, S3, and S4.

In other words, when an accelerator pedal sensor (APS) 3 determines that the accelerator pedal is pressed, since the probability of occurrence of wheel spin is high, the vehicle speed is estimated based on the lowest wheel speed among the wheel speeds of the four wheel speed sensors S1, S2, S3, and S4.

Further, in the estimation of a vehicle speed, when the vehicle is decelerated by brake pedal operation, the vehicle speed may be estimated based on a maximum value among all the output values of the wheel speed sensors S1, S2, S3, and S4.

In other words, when a brake pedal sensor (BPS) 5 determines that the brake pedal is pressed, since the probability of occurrence of wheel lock is high, the vehicle speed may be estimated based on the highest wheel speed among the wheel speeds of the four wheel speed sensors S1, S2, S3, and S4.

Further, in the estimation of a vehicle speed, when a vehicle dynamic control system is operated, the vehicle speed may be estimated based on an average value of two output values except for the minimum value and the maximum value among all the output values of the wheel speed sensors S1, S2, S3, and S4.

For example, the vehicle dynamic control system may be an electronic stability control (ESC) 7. When the ESC 7 is on, the vehicle speed is estimated based on the average value of second and third wheel speeds of the wheel speeds of the wheel speed sensors S1, S2, S3, and S4.

Referring to FIGS. 2A and 2B, these figures help to sequentially explain the control process for the rear wheel steering system of the present disclosure. By receiving the wheel speed output from each of the wheel speed sensors S1, S2, S3, and S4, the wheel acceleration is detected (S10). Then it is determined whether the wheel speed sensors S1, S2, S3, and S4 have the detected wheel acceleration larger than A (S20).

As a result of the determination in S20, if there is one abnormal wheel speed sensor with the wheel acceleration larger than A, the wheel speed of the abnormal wheel speed sensor is replaced with the average value of the wheel speeds of the remaining two normal wheel speed sensors, which do not include the abnormal wheel speed sensor and the normal wheel speed sensor disposed at a position diagonal to the abnormal wheel speed sensor (S30).

In addition, as a result of the determination in S20, if there are two abnormal wheel speed sensors with the wheel acceleration larger than A, the wheel speed of the abnormal wheel speed sensor is replaced with the average value of the wheel speeds of the two normal wheel speed sensors (S40).

Further, as a result of the determination in S20, if there are three abnormal wheel speed sensors with the wheel acceleration larger than A, the wheel speed of the abnormal wheel speed sensor is replaced with the wheel speed of one normal wheel speed sensor (S50).

Further, as a result of the determination in S20, if there are four abnormal wheel speed sensors with the wheel acceleration larger than A, the wheel speed of the abnormal wheel speed sensor is replaced with the vehicle speed calculated by an engine management system (EMS) 9 (S60).

Next, it is determined whether the absolute value of the value obtained by subtracting the wheel speed of the normal wheel speed sensor from the wheel speed of the abnormal wheel speed sensor is equal to or less than B and this state is maintained for 500 ms or more (S70). When the above condition is satisfied, the abnormal wheel speed sensor is diagnosed as normal and the wheel speed of the normal wheel speed sensor is used to estimate the vehicle speed (S80).

Meanwhile, after S70, it is determined whether the vehicle is accelerated by accelerator pedal operation (S90). When it is determined that the acceleration is performed by the accelerator pedal, among the wheel speeds of the four wheel speed sensors S1, S2, S3, and S4, the minimum value is selected (S100). The vehicle speed is finally estimated based on the selected value (S150).

On the other hand, when the vehicle is not accelerated, it is determined whether the vehicle is decelerated by brake pedal operation (S110). When it is determined that the deceleration is performed by the brake pedal, among the wheel speeds of the four wheel speed sensors S1, S2, S3, and S4, the maximum value is selected (S120). The vehicle speed is finally estimated based on the selected value (S150).

On the contrary, when the acceleration or deceleration operation is not performed, it is determined whether braking according to the ESC 7 operation occurs (S130). When it is determined that the braking situation occurs, except for the minimum value and the maximum value among the wheel speeds of the four wheel speed sensors S1, S2, S3, and S4, the average value of the remaining two wheel speeds is obtained (S140). The vehicle speed is finally estimated based on the obtained average value (S150).

Then, finally, the rear wheels are steered and controlled based on the estimated vehicle speed (S160).

Figure 3:
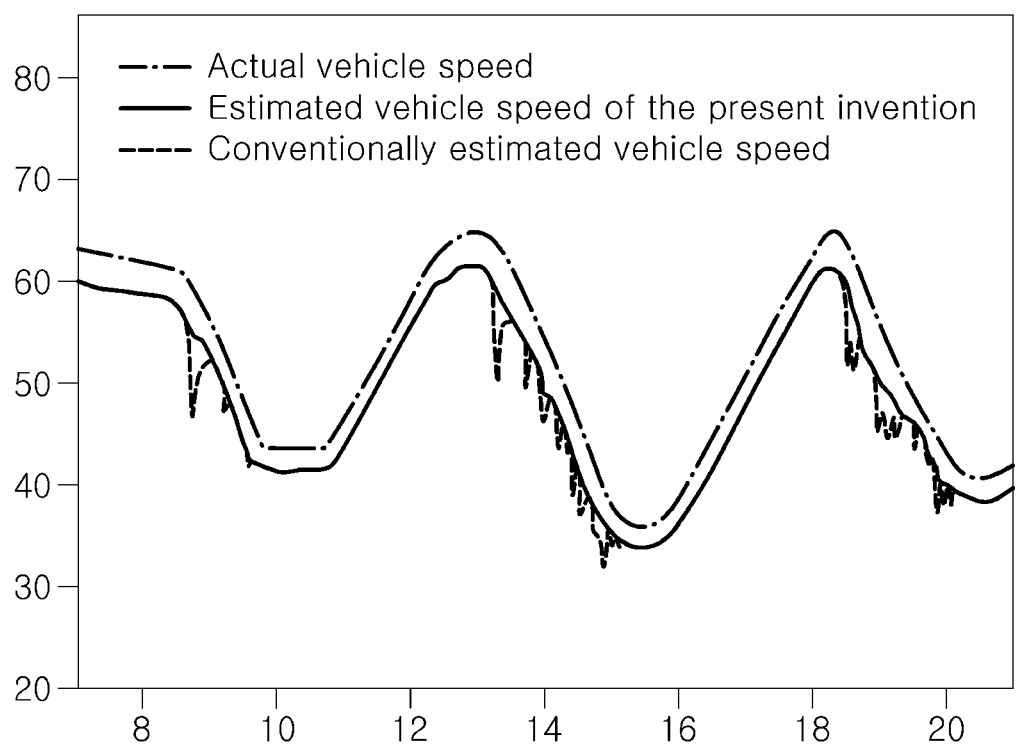
FIG. 3 is a chart showing comparison vehicle speed estimation results according to the present disclosure with conventional vehicle speed estimation results.

As described above, according to the present disclosure, when an error is detected in the wheel speeds of the wheel speed sensors S1, S2, S3, and S4, based on the wheel speed of the normal wheel speed sensor, the abnormal wheel speed is replaced to estimate the vehicle speed. As shown in FIG. 3, it is thereby possible to estimate vehicle speed more accurately than the conventional vehicle speed estimation result. A sudden change in a rear wheel steering control amount is thus prevented, thereby preventing occurrence of a sense of difference due to rear wheel steering control.

Although an embodiment of the present disclosure has been described for illustrative purposes, those having ordinary skill in the art will appreciate that various modifications, additions and substitutions are possible, without departing from the scope and spirit of the invention as disclosed in the accompanying claims.

What is claimed is:

1. A control method of a rear wheel steering system, the control method comprising:
   detection of an error among four wheel speed sensors by a controller based on output values of the wheel speed sensors;
   estimation of a vehicle speed using output values of remaining normal wheel speed sensors except for an output value of an abnormal wheel speed sensor where the error is detected, when the controller detects the error in the abnormal wheel speed sensor; and
   control of steering of rear wheels by the controller based on the estimated vehicle speed,
   wherein in the estimation of a vehicle speed, when one abnormal wheel speed sensor of the four wheel speed sensors is detected, an output value of the abnormal wheel speed sensor is replaced with an average value of output values of two normal wheel speed sensors except for a remaining normal wheel speed sensor disposed at a position diagonal to the abnormal wheel speed sensor.

2. The control method of claim 1, wherein in the detection of an error,
   when wheel acceleration output from the wheel speed sensors is equal to or greater than a set value, it is determined that an error has occurred.

3. The control method of claim 1, wherein in the estimation of a vehicle speed,
   when two abnormal wheel speed sensors of the four wheel speed sensors are detected, an output value of the abnormal wheel speed sensor is replaced with an average value of output values of remaining two normal wheel speed sensors.

4. The control method of claim 1, wherein in the estimation of a vehicle speed,
   when three abnormal wheel speed sensors of the four wheel speed sensors are detected, an output value of the abnormal wheel speed sensor is replaced with an output value of remaining one normal wheel speed sensor.

5. The control method of claim 1, wherein after the estimation of a vehicle speed, the abnormal wheel speed sensor is diagnosed as normal when a state where an absolute value of a difference between the output value of the abnormal wheel speed sensor and the output value of the normal wheel speed sensor is equal to or less than a set value is maintained for a predetermined time.

6. The control method of claim 1, wherein in the estimation of a vehicle speed, when the vehicle is accelerated by accelerator pedal operation, the vehicle speed is estimated based on a minimum value among all the output values of the wheel speed sensors.

7. The control method of claim 1, wherein in the estimation of a vehicle speed, when the vehicle is decelerated by brake pedal operation, the vehicle speed is estimated based on a maximum value among all the output values of the wheel speed sensors.

8. The control method of claim 1, wherein in the estimation of a vehicle speed, when a vehicle dynamic control system is operated, the vehicle speed is estimated based on an average value of two output values except for a minimum value and a maximum value among all the output values of the wheel speed sensors.

9. A control method of a rear wheel steering system of a vehicle, the control method comprising:

detecting, by a controller, at least one abnormal wheel speed sensor from among four wheel speed sensors as an error based on output values of the wheel speed sensors;

determining, when the controller detects the error, an estimated speed value by estimating a vehicle speed using output values of remaining normal wheel speed sensors, excluding an output value of the abnormal wheel speed sensor where the error is detected; and controlling, by the controller, steering of rear wheels of the vehicle based on the estimated vehicle speed, wherein in the estimation of a vehicle speed, when one abnormal wheel speed sensor of the four wheel speed sensors is detected, an output value of the one abnormal wheel speed sensor is replaced with an average value of output values of two normal wheel speed sensors, excluding a remaining normal wheel speed sensor that is disposed at a position diagonal to the abnormal wheel speed sensor on the vehicle.

\* \* \* \* \*